United States Patent [19]

Pruis

[11] Patent Number: 5,143,476

[45] Date of Patent: Sep. 1, 1992

[54] SNAP LOCK SYSTEM FOR TUBULAR PARTS

[76] Inventor: Harry Pruis, 14729 Spring Valley Rd., Morrison, Ill. 61270

[21] Appl. No.: 640,161

[22] Filed: Jan. 11, 1991

[51] Int. Cl.$^5$ .............................................. F16B 7/10
[52] U.S. Cl. .................... 403/328; 403/108; 403/378
[58] Field of Search ............... 403/108, 328, 329, 109, 403/377, 378

[56] References Cited

U.S. PATENT DOCUMENTS

| | | | |
|---|---|---|---|
| 2,752,218 | 6/1956 | Shea, Sr. | 403/108 X |
| 2,932,047 | 4/1960 | Johnston | 403/328 X |
| 3,090,329 | 5/1963 | Rolfe, Jr. | 403/328 X |
| 3,603,628 | 9/1971 | Smith | 403/329 |
| 3,712,652 | 1/1973 | Uilkema | 403/108 |
| 4,711,595 | 12/1987 | Magid et al. | 403/108 |

Primary Examiner—Peter M. Cuomo
Attorney, Agent, or Firm—Edmond T. Patnaude

[57] ABSTRACT

A snap lock will hold in assembled relationship two tubular parts one within the other in telescopic relationship. The locking mechanism has a rectangular base with rectilinear outer ends and a button urged by a spring perpendicularly away from the base. The base will slide within tracks along the inner walls of the male tubular part and the button will project through an aperture in the wall of the male part which is complementary to the shape of the button. The female tubular member has an aperture in its walls which is also complementary to the shape of the button such that the button will project into the aperture in the female member when one aperture is aligned over the other.

16 Claims, 2 Drawing Sheets

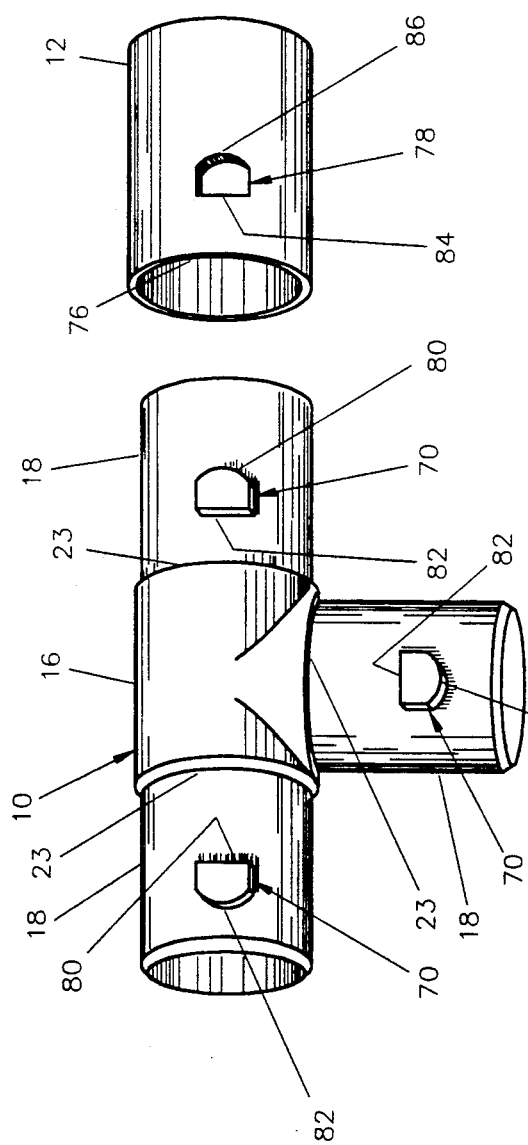
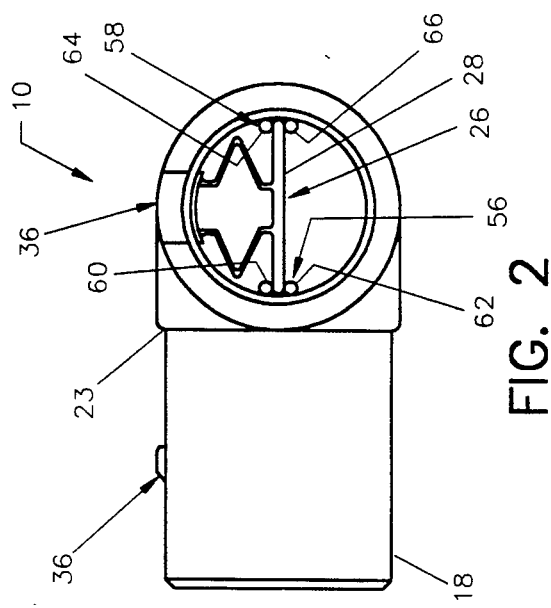

SNAP LOCK SYSTEM FOR TUBULAR PARTS

The present invention relates generally to telescopic tubular parts which can be mutually assembled and disassembled, and more particularly to tubular parts which can be removably locked together.

BACKGROUND OF THE INVENTION

Interconnectable tubular parts have many uses such as in toys which comprise a plurality of tubular sections, the ends of which can be rigidly connected or disconnected from each other to enable children to assemble various structures which resemble buildings, bridges, vehicles and other objects. Unless a locking mechanism is provided to hold the ends of the tubular member in assembled relationship, the parts may disassemble as a result of stresses within the structure or contact of any object with the structure.

It would be desirable to provide a locking mechanism for use with interfitting tubular parts which is easily manufactured, easily assembled, and which can be easily operated by a child. One prior art locking mechanism is shown in U.S. Pat. No. 4,711,595 and requires the depression of two exterior buttons simultaneously to disassemble male and female sockets from one another. U.S. Pat. No. 4,528,998 shows a locking mechanism which utilizes a single button for locking telescoping tubes in selected positions.

BRIEF DESCRIPTION OF THE INVENTION

Briefly, the present invention provides a locking mechanism for locking male and female tubular members in telescopic relationship.

In a preferred embodiment the locking mechanism is a molded part having a rigid base with parallel rectilinear outer ends which are adapted to slide within a pair of diametrically opposing tracks longitudinally oriented along the inner walls of a male tubular member. The molded part further includes a locking button connected to the base by integral spring arms which resiliently urge the locking button away from the base. The button projects through an aperture in the male tubular member when the base is disposed in the opposing tracks. An aperture in the female tubular member is adapted to receive the button when the tubular members are assembled in telescopic relationship with the first tubular member positioned within the second tubular member and with the apertures in the two tubular members in radially aligned relationship. The locking button has an inclined or ramp surface on the side which faces toward the open end of the male tubular member.

An external annular flange is provided on the male member for limiting insertion of the male member into the female member and for facilitating alignment of the aperture in the female member with the locking button carried by the male member.

BRIEF DESCRIPTION OF THE DRAWINGS

The present invention will be better understood by a reading of the following detailed description taken in connection with the accompanying drawings wherein:

FIG. 1 is an isometric view of two tubular parts constructed in accordance with the present invention;

FIG. 2 is an end view of one of the parts shown in FIG. 1;

DETAILED DESCRIPTION OF THE INVENTION

Figure 5:
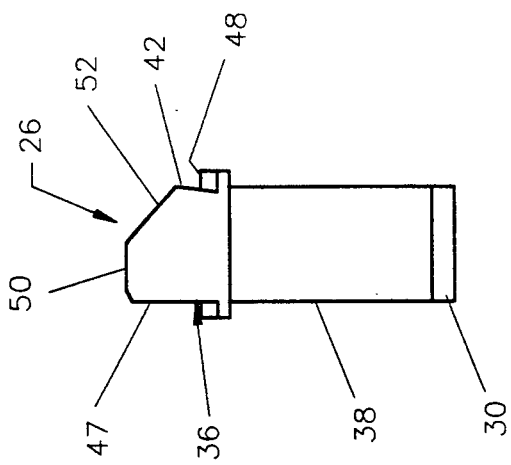
FIG. 5 is a side elevational view of the locking element shown in FIG. 3.

Referring to FIGS. 1 and 2, two parts which can be assembled and disassembled include a T connector 10 and a tubular member 12. The T connector 10 has a central body portion 16 and three tubular arm sections 18. The sections 18 are identical and have outer diameters which permit the arm sections 18 to slidably fit inside the tubular member 12 in telescopic relationship therewith. External annular shoulders 23 are provided at the joinder of the arm sections 18 with the central body portion 16.

Figure 4:
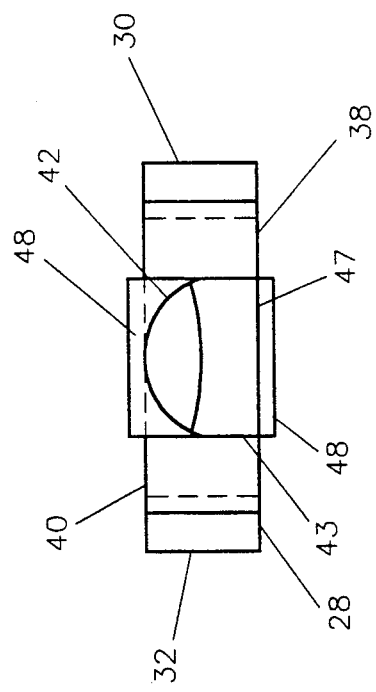
FIG. 4 is a top view of the locking element shown in FIG. 3.
Figure 3:
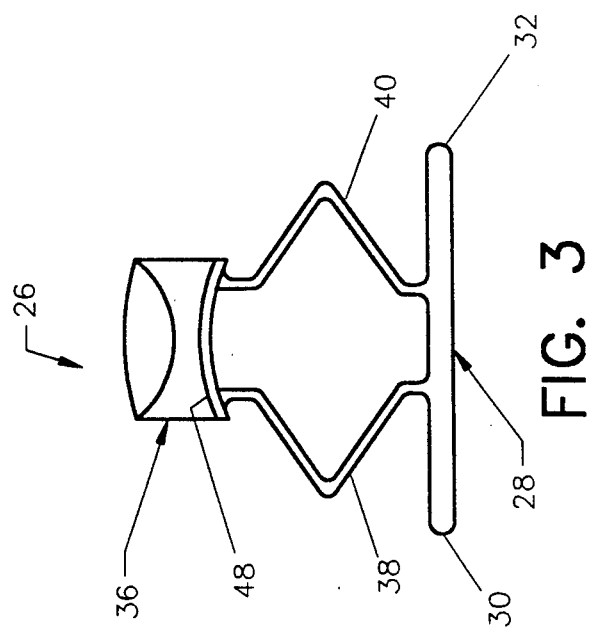
FIG. 3 is a plan view of a locking element constructed in accordance the present invention.

Referring to FIG. 3, 4 and 5, within each arm 18 of the T connector 10 the invention provides for a locking element 26. The locking element 26 is a one-piece plastic part having a rigid, rectangular base portion 28 having parallel, rectilinear outer ends 30, 32. The locking element 26 further has a raised button 36 which is connected to the center of the base portion 28 by a pair of spring fingers 38, 40. Each of the spring fingers 38, 40 is molded into a V shape so that the ends of the V resiliently resist compression when the button 36 is moved linearly toward the base portion 28. The raised button 36 has a substantially cylindrical side 42 and opposing the cylindrical side 42 is a vertically planar surface 47 as can be seen in FIG. 4 and 5. Extending around the bottom of the button 36 is an external rectangular flange 48. The button 36 further has a planar upper surface 50 and an inclined ramp surface 52 on the cylindrical side 42.

Along the length of the inner walls of each arm section 18 are diametrically opposing tracks 56 and 58. The tracks 56 and 58 consist of two parallel ribs 60, 62 and 64, 66 respectively. The ribs 60, 62, and the ribs 64, 66 are spaced apart by a distance slightly greater than the thickness of the base 28 so as to permit the parallel outer ends 30, 32 of the base portion 28 of the locking element 26 to fit slidably therein.

Midway around the circumference of the section 18 between tracks 56 and 58, and a fixed distance from the shoulders 23 there is provided an aperture 70 having a shape and size so as to permit the button 36 to pass through. The button 36 is positioned on the base portion 28 such that the ramp side 52 is directed toward the open end of arm section 18 and the vertical planar surface 47 is directed toward the shoulder 23. When the locking element 26 is inserted into the arm section 18, with the outer ends 30, 32 of the base portion 28 between the parallel ribs 60, 62 and 64, 66 and with the button 36 aligned with the aperture 70, the button 36 will project above the outer surface of the arm section 18 with the rectangular flange 48 abutting the inside surface of the arm section 18. The upper surface of rectangular flange 48 is arcuate so as to conform to the abutting surface of the section 18 when the button projects through aperture 70.

The tubular member 12 has adjacent its end 76 an aperture 78 which is complimentary in shape to the portions of the button 36 disposed outwardly of the flange 48 and positioned such that when the tubular member 12 is slid over an arm section 18 of T connector 10 until the end 76 abuts shoulder 23 the button 36 can project in locking relationship through the aperture 78.

It should be apparent that the distance between aperture 78 and the end 76 of tubular member 12 must be equal to the distance between the aperture 70 and the shoulder 23 of the arm section 18, Also, the aperture 70 has a arcuate edge 80 adjacent the open end of the arm section 18, and a straight edge 82 transverse to the axis of arm section 18 furthest from the open end of arm section 18. Similarly, the aperture 78 has a linear edge 84 which extends transverse to the longitudinal axis of the tubular member 12 and adjacent to the end 76, and an arcuate edge 86 which is the furthest portion from the end 76.

To assemble the parts, the tubular member 12 is slid over an arm section 18 of the T connector 10. As the arm section 18 is slid within tubular member 12, the end 76 will slide along the inclined surface 52 and depress the button 36 into the arm 18. When the distal end 76 of the tubular member 12 abuts against the shoulder 23 and the aperture 78 is aligned with the aperture 70, the button 36 will snap into the aperture 78 and thereby retain the arm section 18 in assembled relationship within the tubular member 12. The parts can be easily disassembled by depressing the button 36 below the inner surface of the member 12 to permit the tubular member 12 to be withdrawn from the arm section 18.

The locking element 26 is best made by molding it as a single piece from a suitable resilient plastic. The T connector 10 and tubular member 12 may also be molded from plastic.

While the present invention has been described in connection with a single embodiment, it will be apparent to those skilled in the art that many changes and modifications may be made without departing from the true spirit and scope of the present invention. Therefore, it is intended by the appended claims to cover all such changes and modifications which come within the true spirit and scope of this invention.

What is claimed:

1. A locking mechanism for locking together first and second interfitted tubular members, said first tubular member having a wall with inner and outer wall surfaces and fitting within said second tubular member, comprising in combination;
   parallel opposing longitudinally extending track means being located on said inner wall surface within said first of said tubular members,
   locking means disposed within said first tubular member and longitudinally slidable along said track means,
   said locking means including a base portion, a button and a spring urging said button outwardly from said base portion through an aperture in the wall of said first tubular member, said aperture being equally distant from each of said parallel track means,
   said base portion having mutually parallel edges for providing slidable engagement in said track means and
   said second tubular member having an aperture in the wall thereof for disposition over said aperture in the wall of said first tubular member for receiving said button when said first tubular member is positioned within said second tubular member.

2. The locking mechanism according to claim 1, wherein
   said track means comprises
   a pair of longitudinal extending ribs integral with said first tubular member.

3. The locking mechanism according to claim 1, wherein said button has a ramp surface on the side thereof facing the distal end of said first tubular member.

4. The locking mechanism according to claim 3, comprising
   stop means on one of said tubular members positioned to engage the distal end of the other of said tubular members when said apertures are in mutual radial alignment.

5. A locking mechanism according to claim 4, wherein said stop means comprises,
   an annular external shoulder on said first tubular member.

6. A locking mechanism according to claim 5, wherein
   said locking means including said spring and said button is a single molded plastic part.

7. A locking mechanism according to claim 1, wherein
   said locking means including said spring and said button is a single molded plastic part.

8. A locking mechanism according to claim 7, wherein said parallel edges of said base portion are rectilinear.

9. A locking mechanism according to claim 8, wherein said track means comprises
   diametrically opposed rails positioned along the inner wall surface of said first tubular member and extending longitudinally with respect to said first tubular member with said parallel rectilinear edges of said base portion disposed therein.

10. A locking mechanism for locking together first and second interfitted tubular members wherein said first tubular member having inner and outer wall surfaces and fitting within said second tubular member, comprising in combination:
    parallel opposing longitudinally extending tracks being located on said inner wall surface within said first tubular member,
    a locking element having a base, a button, and a spring which urges said button away from said base,
    said baser having mutually parallel edges, for providing slidable engagement in said tracks,
    said first tubular member having an aperture therein for receiving said button,
    said second tubular member having an aperture therein which when positioned over said aperture in said first tubular member will receive said button.

11. A locking mechanism in accordance with claim 10 wherein said spring comprises a pair of V-shaped fingers made of a resilient material.

12. A locking mechanism in accordance with claim 11 wherein said locking element is molded as a single part.

13. A locking mechanism in accordance with claim 11 wherein each of said tracks comprise parallel ribs integral with said first tubular member between which one of said edges will slide.

14. A locking mechanism in accordance with claim 13 further comprising stop means on one of said tubular members positioned to engage the distal end of the other of said tubular member when said apertures are in mutual radial alignment.

15. A locking mechanism in accordance with claim 14 wherein said button has a ramp surface on the side thereof facing the distal end of the first tubular member.

16. A locking mechanism in accordance with claim 10 wherein said tracks are diametrically opposing.

* * * * *

UNITED STATES PATENT AND TRADEMARK OFFICE
CERTIFICATE OF CORRECTION

PATENT NO. : 5,143,476
DATED : Sept. 1, 1992
INVENTOR(S) : Harry Pruis

It is certified that error appears in the above-identified patent and that said Letters Patent is hereby corrected as shown below:

Column 4, line 41, after "said" delete "baser" and substitute --base--.

Signed and Sealed this

Fourteenth Day of September, 1993

Attest:

BRUCE LEHMAN

Attesting Officer

Commissioner of Patents and Trademarks